US008964648B2

(12) United States Patent
Beser

(10) Patent No.: US 8,964,648 B2
(45) Date of Patent: *Feb. 24, 2015

(54) SYSTEMS AND METHODS FOR PROVIDING TIME AND LOCATION DEPENDENT BANDWIDTH IN WIRELESS NETWORKS

(71) Applicant: Telsima Corporation, Sunnyvale, CA (US)

(72) Inventor: Nurettin Burcak Beser, Palo Alto, CA (US)

(73) Assignee: Telsima Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,780

(22) Filed: Dec. 31, 2013

(65) Prior Publication Data

US 2014/0113648 A1 Apr. 24, 2014

Related U.S. Application Data

(63) Continuation of application No. 13/764,584, filed on Feb. 11, 2013, now Pat. No. 8,619,697, which is a continuation of application No. 11/748,450, filed on May 14, 2007, now Pat. No. 8,385,271.

(60) Provisional application No. 60/747,141, filed on May 12, 2006.

(51) Int. Cl.
| | |
|---|---|
| *H04W 4/00* | (2009.01) |
| *H04W 72/08* | (2009.01) |
| *H04W 4/02* | (2009.01) |
| *H04W 28/20* | (2009.01) |
| *H04W 48/04* | (2009.01) |
| *H04W 64/00* | (2009.01) |
| *H04W 72/04* | (2009.01) |
| *H04W 88/08* | (2009.01) |
| *H04L 29/08* | (2006.01) |

(52) U.S. Cl.
CPC .............. *H04W 72/087* (2013.01); *H04W 4/02* (2013.01); *H04W 28/20* (2013.01); *H04W 72/08* (2013.01); *H04W 48/04* (2013.01); *H04W 64/00* (2013.01); *H04W 72/0453* (2013.01); *H04W 88/08* (2013.01); *H04L 67/18* (2013.01)
USPC ............ 370/328; 370/437; 370/468; 455/450

(58) Field of Classification Search
None
See application file for complete search history.

(56) References Cited

U.S. PATENT DOCUMENTS

| | | | |
|---|---|---|---|
| 7,616,957 | B2 | 11/2009 | Cai |
| 2001/0017851 | A1 | 8/2001 | Yamaguchi et al. |

(Continued)

OTHER PUBLICATIONS

International Search Report and Written Opinion issued Apr. 21, 2008 in International Application No. PCT/US2007/011659.

*Primary Examiner* — Bob Phunkulh
(74) *Attorney, Agent, or Firm* — Sheppard, Mullin, Richter & Hampton LLP

(57) ABSTRACT

Systems and methods are described for allocating bandwidth in a wireless network. Entry of subscriber equipment into a wireless network is detected at a base station which typically provides information used to determine geographic location of the subscriber equipment. Based on the determined location, a level of service is selected from a plurality of service levels available to a subscriber and provided. Location can be determined based on information provided by the subscriber equipment, provided by a global positioning system and/or provided by a user of the subscriber equipment. Location of the subscriber equipment can be identified with an activity of a user of the subscriber equipment, including business and non-commercial activity. Selection of the level of service may be further based upon time of day, day of week or upon a date and time of provision of the level of service.

26 Claims, 3 Drawing Sheets

(56) References Cited

U.S. PATENT DOCUMENTS

| | | |
|---|---|---|
| 2001/0041554 A1 | 11/2001 | Rowell |
| 2006/0056454 A1 | 3/2006 | Dispensa et al. |
| 2006/0063548 A1 | 3/2006 | Kim |
| 2007/0135166 A1 | 6/2007 | Ding et al. |
| 2007/0167175 A1 | 7/2007 | Wong et al. |
| 2007/0178903 A1 | 8/2007 | Cai |

SYSTEMS AND METHODS FOR PROVIDING TIME AND LOCATION DEPENDENT BANDWIDTH IN WIRELESS NETWORKS

CROSS-REFERENCE TO RELATED APPLICATIONS

The present application is a continuation of and claims benefit from U.S. patent application Ser. No. 13/764,584, filed Feb. 11, 2013 and entitled "Systems and Methods for Providing Time and Location Dependent Bandwidth in Wireless Networks," now U.S. Pat. No. 8,619,697, which is a continuation of and claims benefit from U.S. patent application Ser. No. 11/748,450, filed May 14, 2007 and entitled "Systems and Methods for Providing Time and Location Dependent Bandwidth in Wireless Networks," now U.S. Pat. No. 8,385,271, which claims priority from U.S. Provisional Patent Application Ser. No. 60/747,171 filed May 12, 2006 and entitled "Location/Date/Time Dependent Bandwidth," each of which is incorporated by reference herein.

BACKGROUND OF THE INVENTION

1. Field of the Invention

The present invention relates generally to wireless networks and more particularly to provisioning of bandwidth in wireless networks.

2. Description of Related Art

Wireless Broadband Access ("WBA") based systems have been designed to have operational characteristics that are indistinguishable from Cable or DSL methods of broadband access from the viewpoint of the customer. However, the mobility of subscribers and the architecture of wireless networks can prohibit service providers from offering levels of service based on characteristics of subscribers. For example, a residential subscriber may use a portable computing device at home and in the office. Since commercial subscription plans tend to provide higher bandwidth and richer feature sets at premium rates, the residential user generally receives inadequate service and the service provider may not realize optimized income for all subscribers.

The latterly described issue is one of many quality-of-service and subscription level enforcement issues associated with wireless networks. Wireless Broadband Access ("WBA") is used for packet switched networks for Internet Access, PSTN Voice Line transport and many other purposes. WBA may serve different locations and different types of subscribers and individual subscribers may move from one location to the other and engage in different activities at each location. For examples, a consumer may buy a Wireless Modem (WM) to connect to WBA at home under a subscription that provides 1 Mbps access for a first price. During weekdays the consumer uses the WM at the workplace for access to the Internet. However, the provider sells Internet service to businesses at a higher rate than to residential users. Thus, a provider with a mixed customer base of consumers and businesses may lose revenue because of such use.

BRIEF SUMMARY OF THE INVENTION

Certain embodiments of the invention enable the provision of enhanced service in wireless networks independent of subscriber station and CPE configuration and consistent with the characteristics of wired ADSL or cable network services. Accordingly, inherent differences between wireless and wired network designs are accommodated.

Certain embodiments provide methods by which quality of service can be adjusted dynamically by location, time of day and other factors impacting network infrastructure business. Adjustment of quality of service can include modifying the amount of bandwidth provisioned for a subscriber, priority assignments and network response times. Providers may dynamically alter quality of service based on subscriptions contracted with users that specify levels of service for specified uses of the network where the uses may include geographic usage, time-of day usage, day of week usage and type of traffic.

BRIEF DESCRIPTION OF THE DRAWINGS

The structural and functional aspects of the invention will become understood by those skilled in the art by reference to the following detailed description when taken in conjunction with the appended drawings, in which.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention enable the provision of enhanced service in wireless networks independent of subscriber station and CPE configuration. Certain embodiments enable the provision of wireless broadband access service that appears to have the same characteristics as wired ADSL or cable network services and inherent differences between wireless and wired network designs are accommodated and concealed as appropriate. For example, the differences between wired and wireless services include the effects of unpredictable fading that can occur in wireless networks causing subscriber stations to occasionally disconnect from one base station and reconnect to a different base station.

Figure 1:
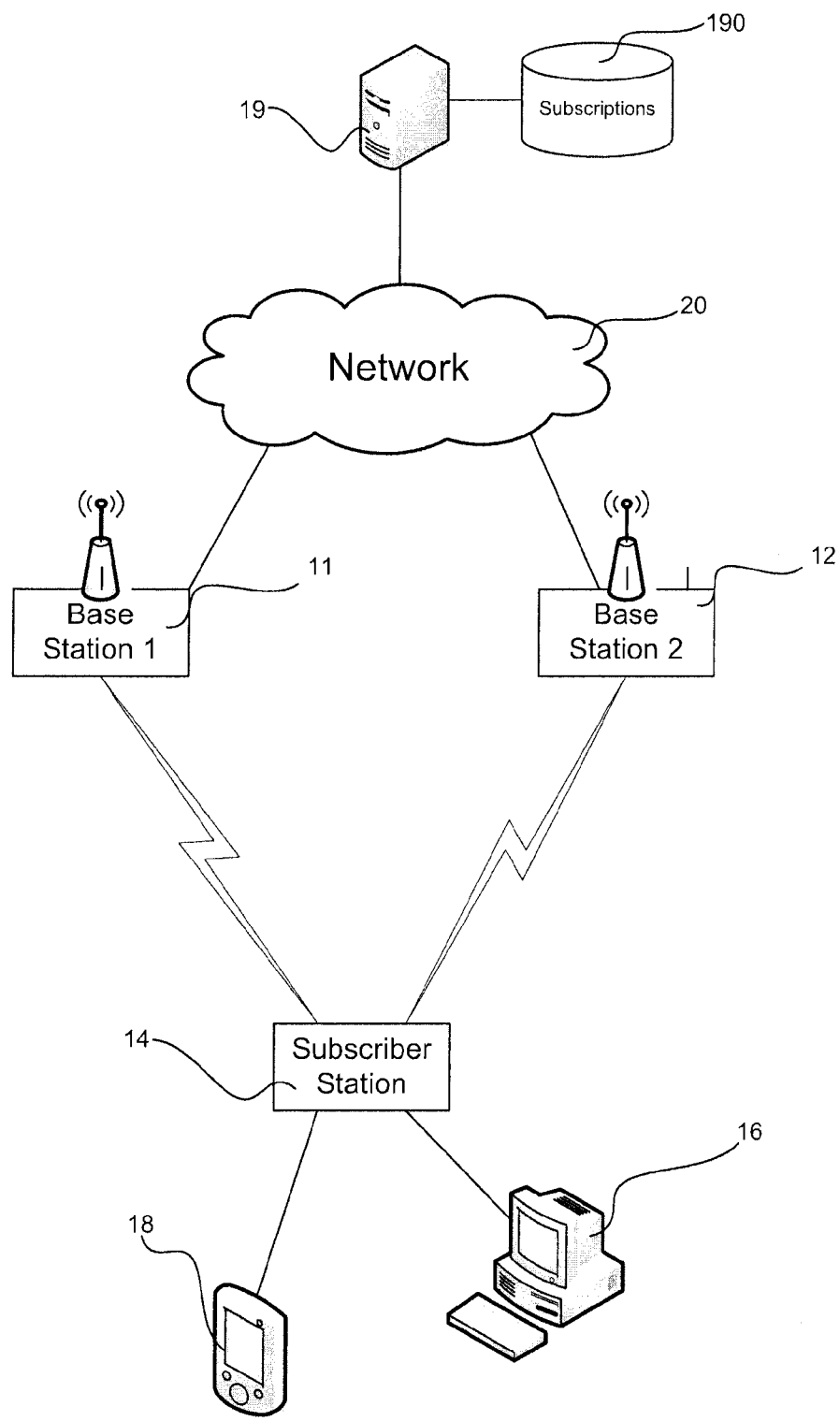
FIG. 1 illustrates a simple example of a wireless network.

With reference to FIG. 1, certain embodiments employ an architecture that can be implemented without significantly increasing system operational complexity and requiring little additional computation power. In one example, a subscriber station 14 includes a network interface that can detect a first base station 11 and a second base station 12. Subscriber equipment can be connected through the network interface. The subscriber equipment can include one or more personal computers 16 and mobile devices 18 including PDAs cell phones, tablet computers and other such equipment. The subscriber station can be integrated with the subscriber equipment 16 and 18 or can be provided as a network interface in customer premises equipment such as routers, switches, bridges and so on.

The base stations 11 and 12 may provide signals from the same network 20 using same or different frequencies, same or different modulation schemes and same or different data encoding standards. In some embodiments, subscriber station 14 may be configurable to communicate with base stations of different wireless networks. Certain aspects of the invention facilitate the construction of low-cost, reliable networks using, at the core, existing wireless infrastructure and components. Certain embodiments provide configuration methods together with a plurality of components, features and capabilities that address issues existing in conventional systems. In one example, the provided components can include debugging and maintenance tools that ease management of layer-2 networks that are otherwise difficult to maintain and debug due to their inherently flat topography. Debugging and maintenance tools may be configured and operated using customized configuration methods and interfaces. In many embodiments, the architecture may be implemented from combinations of existing network equipment.

Figure 2:
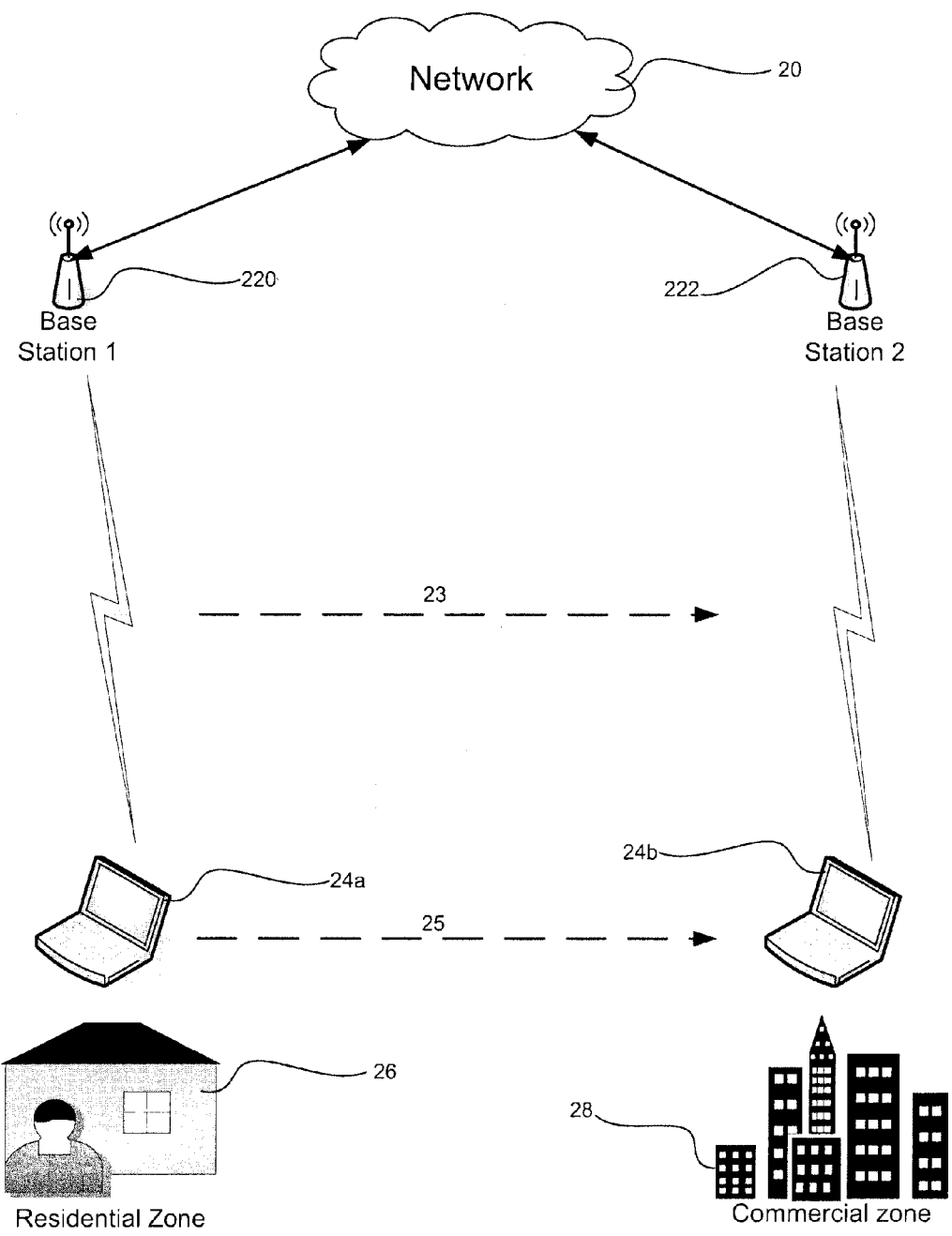
FIG. 2 depicts a simplified example in which bandwidth is allocated according to location date and time.

Referring now to FIG. 2, in a simplified example, a wireless network subscriber may connect to a network 20 such as the Internet or some other private or public network. The subscriber may connect to the network 20 through any of two or more base stations 220 and 222 according to factors that may include location (see 26 and 28), time of day, user selection, system provider configuration and so on. In one simple example, a connection to network 20 can be established with laptop 24*a* located at the subscriber's home 26 using first base station 220. The subscriber may then transport (25) the laptop 24*b* to a business location 28 and reconnect (23) to network 20 through second base station 222.

Certain embodiments of the invention provide components that can detect the location of the laptop 24*a*, 24*b* based on the point of entry 220, 222 to the network 20. Point of entry may be determined for the purpose of configuring service level, but in at least some embodiments, the identity of the base station 220, 222 through which the subscriber equipment 24*a*, 24*b* accesses the network 20 may be captured for other reasons including billing reasons and to enable the provision of localized service and so on.

In certain embodiments, location of the subscriber equipment may be determined by various methods including triangulation, global positioning system (GPS) based methods, user input and other means. Triangulation methods may include identifying location of the subscriber equipment by identifying base stations that can receive signals from the subscriber system. Triangulation may also include calculating position based on signal strength received at or from a plurality of base stations. GPS methods typically involve accessing GPS location information obtained by the subscriber equipment. Furthermore, users of the subscriber equipment may select a mode of usage when connecting to the system. Subscribers may contract for different service levels at different times of day.

Certain embodiments provide methods by which quality of service can be adjusted dynamically by location, time of day and other factors impacting network infrastructure business. Adjustment of quality of service can include modifying the amount of bandwidth provisioned for a subscriber, priority assignments and network response times. In certain embodiments, Wireless Broadband Access ("WBA") base stations used to manage air-links can be controlled by a network element that distributes bandwidth using factors including location, date, day of the week and time. WBAs can operate to control bandwidth usage by individual subscribers and can move a Wireless Medium ("WM") from one BS to the other.

Providers may dynamically alter quality of service based on subscriptions contracted with users that specify levels of service for specified uses of the network 20 where the uses may include geographic usage, time-of day usage, day of week usage and type of traffic. In one example, business users may contract for increased bandwidth during normal business hours and reduced bandwidth at other times. In another example, a consumer may subscribe to bandwidth for use at home and the provider may reduce bandwidth if the consumer accesses the network 20 while away from the consumer's home area. Detection of user location can rely on determining that the currently connected base station is not in the vicinity of the consumer's home address. In one example, bandwidth can be controlled by physical location such that a residential subscriber may obtain a maximum 1 Mbps while at home (or while in a residential area) but, when subscriber connects equipment in a business district, the subscriber's link is restricted to 256 Kbps to reflect the differences in residential and business subscription pricing.

In another example, quality of service can be controlled to provide residential and business subscribers with variable bandwidths. Thus bandwidth allocated to a subscriber can be changed at the start of the working day and again at the end of the working day. In some embodiments, a residential subscriber may experience a drop in bandwidth at the start of the business day while business subscribers may obtain increased or flat bandwidth. In another example, a subscription can be structured to provide levels or quality of service based on location of connection and time of day and date. Thus, bandwidth in a business district on a public holiday may be decreased to enable an increase in bandwidth to residential subscribers. In certain embodiments, providers can sell subscribers differentiated services by controlling bandwidth based on location, date and time.

Figure 3:
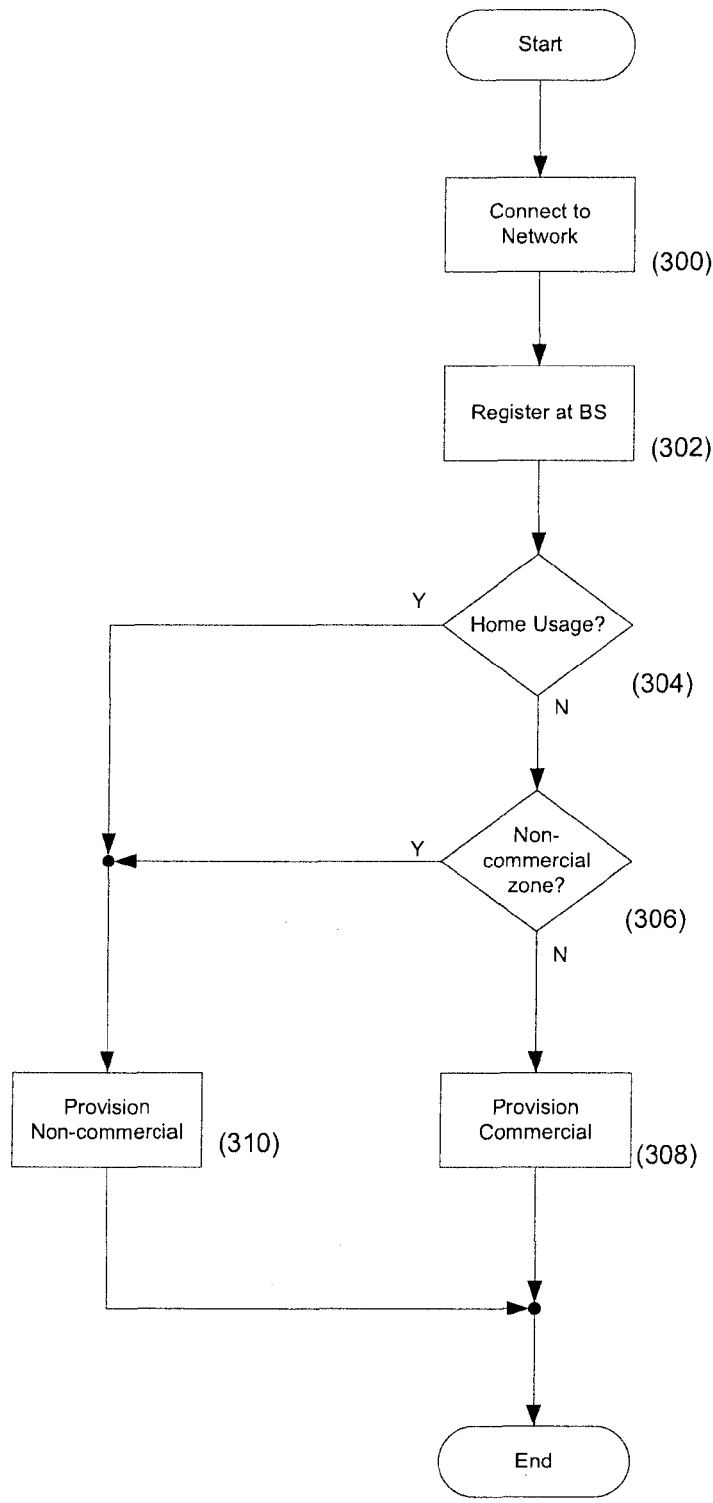
FIG. 3 is an overview flowchart describing an example of bandwidth allocation.

FIG. 3 illustrates a process for determining level of service to be provided to a subscriber. At step 300, the subscriber is identified when connecting to the network 20. Identification may be made based on equipment identification or by an authorization system such as UserID/password system or other authentication system. Upon connecting to a network base station, the system may acquire location information associated with the subscriber equipment. For example, location information may be derived from the geographic location of the base station, GPS information provided by the subscriber station, input from the subscriber/user and by triangulation or other means.

In certain embodiments, location information is gathered during registration of the subscriber station by the base station at step 302. During registration, subscription information can be accessed to determine level of service associated with the subscriber station. At step 304, the location information may be used to determine if residential service level should be provided at step 310. Time of day, day of week and other temporal information can be used in determining whether residential service levels should be applied at step 304.

In certain embodiments, a clear determination of level of service may not be determinable from a combination of location and temporal information. For example, the subscriber equipment may be connected during business hours at a location that is not specifically identified as either residential or commercial. One example may be mixed-use areas of a city; another example may be the connection of the subscriber equipment in a different city or in a location that is not associated by contract or otherwise with either residential or commercial use. In such cases, the level of service provided may be determined at step 306 based on contract terms, patterns of usage, user or subscriber input and nature of communication requested. Where the use is determined to be commercial, and appropriate level of service may be provided at step 308.

Quality of service may be controlled centrally or locally. In centrally controlled networks, commands are typically dispatched from a management system 19 at predetermined intervals. These intervals may correspond to transition times or may be transmitted at fixed intervals. In some embodiments, provisioning information derived from subscription details 190 can be distributed to and maintained at base stations 11 and 12 and can be updated as required. In many embodiments, quality of service information is loaded at base stations 11 and 12 when the network controlled by the base station 11 and 12 identifies addition or deletion of a device and when the base station 11 and 12 is initiated.

In certain embodiments, quality of service can be adjusted dynamically by location, time of day and other factors impacting network infrastructure business. Wireless Broadband Access ("WBA") base stations used to manage air-links can be controlled by a network element (NE) that distributes bandwidth using factors including location, date, day of the week and time. WBAs can operate to control bandwidth usage by individual subscribers and can move a Wireless Medium ("WM") from one BS to the other.

In certain embodiments, bandwidth is controlled by physical location. For example, a residential subscriber to a 1 Mbps link obtains such bandwidth at home in a residential area. However, subscriber's equipment is mobile and, when subscriber connects equipment in a business district, subscriber's link is restricted to 256 Kbps to reflect the differences in residential and business subscription pricing. In another example, residential and business subscribers can be provided with variable bandwidths. Thus an NE can change the bandwidth allocated to a subscriber at the start of the working day and again at the end of the working day. In some embodiments, a residential subscriber may experience a drop in bandwidth at the start of the business day while business subscribers' may obtain an increase or flat bandwidth through the start of day transition. In another example, a subscription can be structured to provide levels or quality of service based on location of connection and time of day and date. Thus, bandwidth in a business district on a public holiday may be decreased to enable an increase in bandwidth to residential subscribers. In certain embodiments, providers can sell subscribers differentiated services by controlling bandwidth based on location, date and time.

Additional Descriptions of Certain Aspects of the Invention

Certain embodiments of the invention provide a method for allocating bandwidth in a wireless network, comprising detecting at a base station, entry of subscriber equipment into a wireless network, determining location of the subscriber equipment, and based on the determined location, providing a level of service selected from a plurality of service levels available to a subscriber, each service level being associated with one or more locations. In some of these embodiments, determining the location includes identifying the location of the base station. In some of these embodiments, the location is determined based on information provided by the subscriber equipment. In some of these embodiments, the provided information includes information obtained from a global positioning system. In some of these embodiments, the provided information includes information obtained from a user of the subscriber equipment. In some of these embodiments, the location is determined based on information preconfigured by the subscriber. In some of these embodiments, the location is determined based on information preconfigured by a provider of the plurality of service levels. In some of these embodiments, the location is identified with an activity of a user of the subscriber equipment. In some of these embodiments, the activity is a business activity. In some of these embodiments, the activity is a non-commercial activity. In some of these embodiments, the location is determined to be one of a residence and a business. In some of these embodiments, the location is determined to be one of a commercial location and a non-commercial location. In some of these embodiments, the location is determined to be one of a business location and a non-business location. In some of these embodiments, selection of the level of service is further based on time of day. In some of these embodiments, selection of the level of service is further based on the day of week in which level of service is provided. In some of these embodiments, selection of the level of service is further based on date and time of provision of the level of service.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

The invention claimed is:

1. A base station comprising:
   a subscription detail associated with a subscriber; and
   a plurality of qualities of service available to the subscriber at the base station, the plurality of qualities of service including a first quality of service and a second quality of service, each of the first and second qualities of service being defined according to the subscription detail, each of the first and second qualities of service being associated with one or more locations, each of the first and second qualities of service defining an operational characteristic of a bandwidth allocated to subscriber equipment in accordance with the subscription detail;
   the base station being configured to select the first quality of service from the plurality of qualities of service and to provide the first quality of service to the subscriber equipment at a first time based on a location of the subscriber equipment;
   the base station being further configured to select the second quality of service from the plurality of qualities of service and to provide the second quality of service to the subscriber equipment at a second time based on the location of the subscriber equipment.

2. The base station of claim 1, wherein the base station is further configured to detect entry of the subscriber equipment into a wireless network.

3. The base station of claim 1, wherein the base station is further configured to determine the location of the subscriber equipment.

4. The base station of claim 1, wherein the location of the subscriber equipment is determined by identifying a location of the base station and determining the location of the subscriber equipment based on the location of the base station.

5. The base station of claim 1, wherein the location of the subscriber equipment is determined based on information provided by the subscriber equipment.

6. The base station of claim 5, wherein the provided information includes information obtained from a global positioning system.

7. The base station of claim 5, wherein the provided information includes information obtained from a user of the subscriber equipment.

8. The base station of claim 1, wherein the location is determined based on information preconfigured by the subscriber.

9. The base station of claim 1, wherein the location is determined based on information preconfigured by a provider of the plurality of qualities of service.

10. The base station of claim 1, wherein the location is identified with an activity of a user of the subscriber equipment.

11. The base station of claim 10, wherein the activity is a business activity.

12. The base station of claim 10, wherein the activity is a noncommercial activity.

13. The base station of claim 1, wherein the location is determined to be one of a commercial location and a non-commercial location.

14. The base station of claim 1, wherein the location is determined to be one of a business location and a non-business location.

15. The base station of claim 1, wherein the base station is further configured to select the first or second quality of service based on a day of week in which the quality of service is provided.

16. The base station of claim 1, wherein the base station is further configured to select the first or second quality of service based on date or time of provision of the quality of service.

17. The base station of claim 1, wherein the operational characteristic is an amount of the bandwidth allocated to the subscriber equipment.

18. The base station of claim 1, wherein the operational characteristic is a priority assigned to the bandwidth allocated to the subscriber equipment.

19. The base station of claim 1, wherein the operational characteristic is a network response time associated with the bandwidth allocated to the subscriber equipment.

20. A system comprising:
memory storing a subscription detail associated with a subscriber and storing a plurality of qualities of service available to the subscriber at a base station, the plurality of qualities of service including a first quality of service and a second quality of service, each of the first and second qualities of service being defined according to the subscription detail, each of the first and second qualities of service being associated with one or more locations, and each of the first and second qualities of service defining an operational characteristic of a bandwidth allocated to subscriber equipment in accordance with the subscription detail; and
a processor configured to use the subscription detail to select the first quality of service from the plurality of qualities of service, to use the subscription detail to select the second quality of service from the plurality of qualities of service, to provide the first quality of service to the subscriber equipment at a first time based on a location of the subscriber equipment, and to provide the second quality of service to the subscriber equipment at a second time based on the location of the subscriber equipment.

21. A system comprising:
a first base station including a subscription detail associated with a subscriber and including a first plurality of qualities of service available to the subscriber at the first base station, the first plurality of qualities of service including a first quality of service, the first quality of service being defined according to the subscription detail, the first quality of service being associated with one or more locations, the first quality of service defining a first operational characteristic of a first bandwidth allocated to subscriber equipment in accordance with the subscription detail, the first base station being configured to select the first quality of service from the first plurality of qualities of service and to provide the first quality of service to the subscriber equipment based on a first location of the subscriber equipment; and
a second base station including the subscription detail associated with the subscriber and including a second plurality of qualities of service available to the subscriber at the second base station, the second plurality of qualities of service including a second quality of service, the second quality of service being defined according to the subscription detail, the second quality of service being associated with one or more locations, the second quality of service defining a second operational characteristic of a second bandwidth allocated to the subscriber equipment in accordance with the subscription detail, the second base station being configured to select the second quality of service from the second plurality of qualities of service and to provide the second quality of service to the subscriber equipment based on a second location of the subscriber equipment.

22. A method comprising:
detecting, at a first base station, entry of subscriber equipment into a wireless network, the first base station including a subscription detail associated with a subscriber and including a first plurality of qualities of service available to the subscriber at the first base station, the first plurality of qualities of service including a first quality of service, the first quality of service being defined according to the subscription detail, the first quality of service being associated with one or more locations, and the first quality of service defining a first operational characteristic of a first bandwidth allocated to the subscriber equipment in accordance with the subscription detail;
selecting, at the first base station, the first quality of service from the first plurality of qualities of service;
providing, by the first base station, the first quality of service to the subscriber equipment based on a first location of the subscriber equipment;
detecting, at a second base station, entry of the subscriber equipment into the wireless network, the second base station including the subscription detail associated with the subscriber and including a second plurality of qualities of service available to the subscriber at the second base station, the second plurality of qualities of service including a second quality of service, the second quality of service being defined according to the subscription detail, the second quality of service being associated with one or more locations, and the second quality of service defining a second operational characteristic of a second bandwidth allocated to the subscriber equipment in accordance with the subscription detail;

selecting, at the second base station, the second quality of service from the second plurality of qualities of service; and providing, by the second base station, the second quality of service to the subscriber equipment based on a second location of the subscriber equipment.

23. A base station comprising:

a subscription detail associated with a subscriber; and a plurality of qualities of service available to the subscriber at the base station, the plurality of qualities of service including a first quality of service and a second quality of service, each of the first and second qualities of service being defined according to the subscription detail, each of the first and second qualities of service being associated with one or more locations, each of the first and second qualities of service defining an operational characteristic of a bandwidth allocated to subscriber equipment in accordance with the subscription detail;

the base station being configured to select the first quality of service from the plurality of qualities of service and to provide the first quality of service to the subscriber equipment at a first time based on a first location of the subscriber equipment;

the base station being further configured to select the second quality of service from the plurality of qualities of service and to provide the second quality of service to the subscriber equipment at a second time based on a second location of the subscriber equipment.

24. The base station of claim 23, wherein the first location and the second location are the same.

25. A method comprising:

detecting, at a base station, entry of subscriber equipment into a wireless network;

providing a first quality of service to the subscriber equipment based on a first location at a first time; and providing a second quality of service to the subscriber equipment based on a second location at a second time;

the first and second qualities of service being selected from a plurality of qualities of service available to a subscriber at the base station, wherein each quality of service is defined according to a subscription contract associated with the subscriber, wherein each quality of service is associated with one or more locations, and wherein each quality of service defines an operational characteristic of a bandwidth allocated to the subscriber equipment in accordance with the subscription contract.

26. The method of claim 25, wherein the first location and the second location are the same.

\* \* \* \* \*